(No Model.)
N. SEIBERT.
WATER METER.
No. 297,301. Patented Apr. 22, 1884.
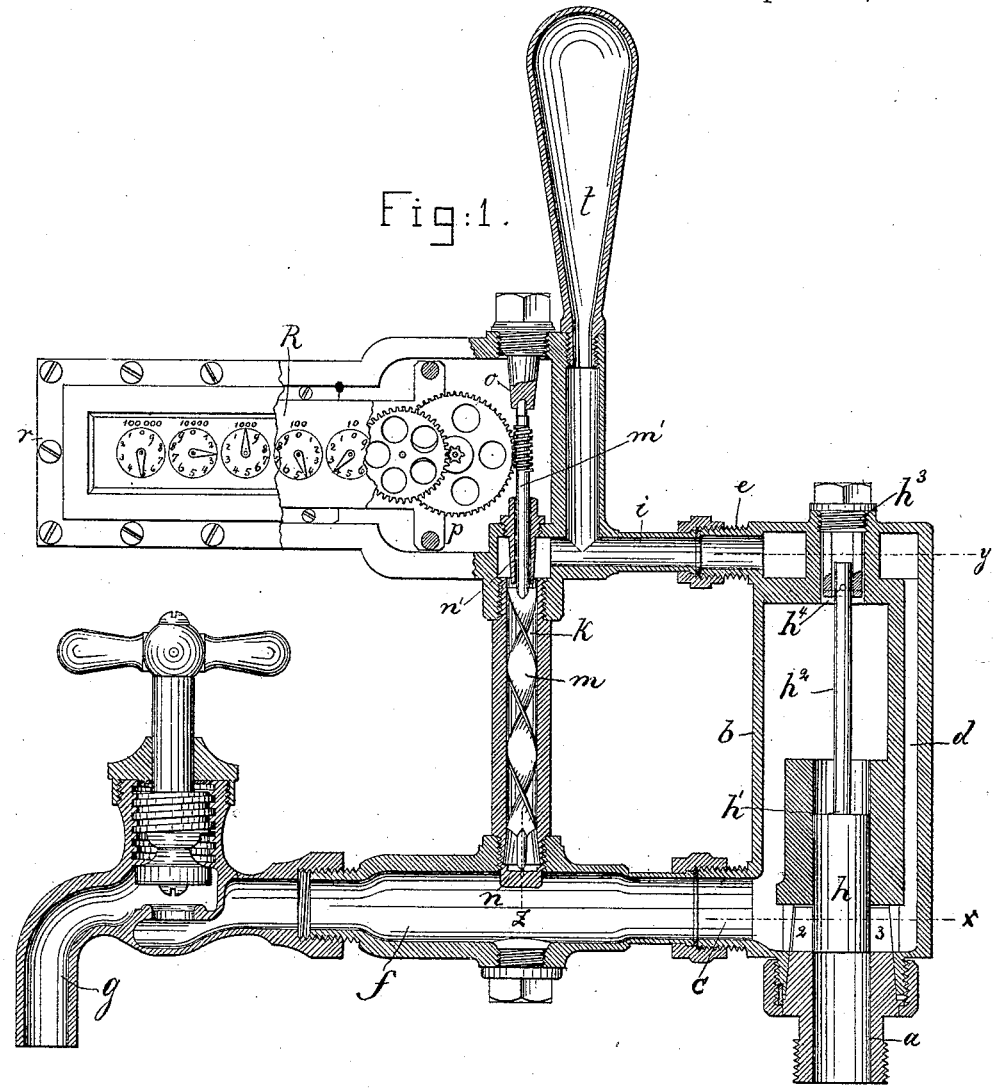
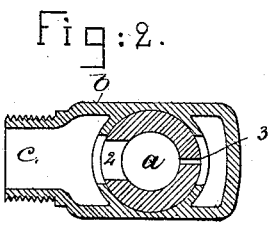
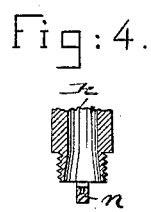
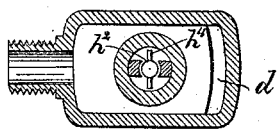
Witnesses
Fred A. Powell
John F. C. Reinkert
Inventor.
Nicholas Seibert.
by Crosby & Gregory attys.

UNITED STATES PATENT OFFICE.

NICHOLAS SEIBERT, OF MAPLEWOOD, ASSIGNOR OF THREE-EIGHTHS TO OLIVER E. SIMMONS, OF BOSTON, AND EDWARD W. SIMMONS, OF JAMAICA PLAIN, MASSACHUSETTS.

WATER-METER.

SPECIFICATION forming part of Letters Patent No. 297,301, dated April 22, 1884.

Application filed July 11, 1883. (No model.)

*To all whom it may concern:*

Be it known that I, NICHOLAS SEIBERT, of Maplewood, county of Middlesex, State of Massachusetts, have invented an Improvement in Water-Meters, of which the following description, in connection with the accompanying drawings, is a specification, like letters on the drawings representing like parts.

My invention relating to water-meters is shown embodied in a meter adapted to be used in immediate connection with a faucet or at the point where the liquid to be measured is drawn.

The invention is intended as an improvement on meters of that class in which the stream is divided so that only a definite portion of the whole amount is measured, while the remainder escapes without being measured, except by the fact that it bears a definite relation to the portion measured.

The invention consists in details of construction of the various parts, whereby the operation of the meter is rendered very certain and perfect.

Figure 1 is a longitudinal section of a fluid-meter embodying this invention; Figs. 2 and 3, horizontal sectional details thereof on lines $x$ and $y$, respectively; and Fig. 4, a vertical sectional detail on lines $z$, showing the pivot or step for the measuring-screw.

The apparatus is adapted to be connected with a delivery-pipe for the fluid to be measured, the said fluid being received at the inlet-passage $a$, from which it passes through ports 2 and 3 (see Fig. 2) into a chamber, $b$, having the main portion of its interior in communication with the port 2, and provided with an outlet, $c$, the said chamber also having an independent passage, $d$, communicating with an outlet, $e$, at its upper end, the liquid passing through the ports 2 and 3, thus being delivered independently through the passages $c$ and $e$. The port 2 is of greater width than the port 3, as shown in a definite ratio—as, for instance, eight or ten to one—so that when the liquid is passing with the same pressure through equal lengths of the said ports measured in the line of the axis of the inlet-passage $a$, the amount passing through the outlet $c$ will be in the same proportion to the amount passing through the outlet $b$ as the width of the port 2 is to that of the port 3. The passage $c$ communicates directly through suitable pipes, $f$, with the faucet or main outlet $g$, the amount flowing through which is to be measured. The inlet-passage $a$, from which the ports 2 3 open, is provided with a valve or plunger, $h$, adapted to pass through the said passage a sufficient distance to wholly close the ports 2 3, the said plunger having a guide, $h'$, in the chamber $b$, and being provided with a stem, $h^2$, passing through a guide in a cap, $h^3$, at the upper end of the said chamber $b$, the said stem being provided with a pin, $h^4$, arresting the downward movement of the valve $h$ when the ports 2 3 are fully closed. The plunger is pressed downward to close the ports by gravitation, and it will be seen that the fluid in the chamber $b$ acts upon its upper surface, so that the fluid-pressure upon it is substantially balanced. When the outlet or passage $g$ is opened, the pressure of the fluid in the inlet-passage $a$ will raise the plunger $h$, opening the valves 2 and 3, the movement of the plunger being proportionate to the amount of liquid flowing through. The liquid passing through the port 3 and escaping at the passage $e$ flows through a passage, $i$, into a passage, $k$, communicating with the pipe $f$, leading from the outlet $c$. The said passage $k$ contains a measuring-screw of steep pitch, pivoted in a step or bearing, $n$, at its lower end, (see Fig. 4,) and having at its upper end a shank, $m'$, passing loosely through a bearing, $n'$, and pivoted in an adjustable pivot-piece, $o$, at its upper end. The shank $m'$ of the said screw is provided with a worm engaging a worm-gear, $p$, forming one wheel of a train of speed-reducing wheel-work, the arbors of which are provided with pointers, and constitute an indicating device, R, of usual construction, it being inclosed in a case, $r$, communicating through the bearing $n'$ with the passage $i$, and consequently subject to the pressure of the fluid being measured. An air-chamber, $t$, communicating with the passage $i$, is employed, so that when the outlet is opened there will be a sudden impulse upon the liquid, causing it to set the screw $m$ rotating with certainty. By this arrangement it will be seen that a definite portion—for instance, one-eighth or one-tenth—of the liquid drawn from the faucet or outlet is measured, and by a simple multiplication, which may be provided for in the indicating device, the whole amount will be determined.

When desired to measure all the liquid directly, the chamber $b$ may be omitted, and the liquid let in at $i$ would all pass through the passage $k$ and thence to the outlet. By placing the recording apparatus in a tight chamber communicating with the pipe from which the liquid is drawn, no packed joints are required, and the screw and indicating mechanism require only a very slight force to actuate them. The liquid being measured does not flow through the chamber $r$, which has a transparent face, and may, if desired, be filled with a lighter liquid than that being measured—such, for instance, as oil—which will remain under a statical pressure, and will offer scarcely any resistance to the slow movement of the wheel-work.

I claim—

The combination of the chamber $b$ and its inlet-passage, having two ports in the sides thereof at the same level, and a valve-guide, forming a continuation of the said inlet-passage, with the valve-plug $h$, longitudinally movable in the said passage, and controlling both ports simultaneously, the outlet-passages $f$ and $i$, communicating with the said ports independently, and the connecting-passage $k$ and measuring-screw $m$ therein, substantially as described.

In testimony whereof I have signed my name to this specification in the presence of two subscribing witnesses.

NICHOLAS SEIBERT.

Witnesses:
   JOS. P. LIVERMORE,
   W. H. SIGSTON.